US008656371B2

(12) United States Patent
Jou (10) Patent No.: US 8,656,371 B2
(45) Date of Patent: Feb. 18, 2014

(54) SYSTEM AND METHOD OF REPORT REPRESENTATION (75) Inventor: Stephan Jou, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 11/855,653

(22) Filed: Sep. 14, 2007

(65) Prior Publication Data

US 2008/0201356 A1  Aug. 21, 2008

(30) Foreign Application Priority Data

Feb. 19, 2007  (CA) ..................................... 2578979

(51) Int. Cl.
G06F 9/45  (2006.01)

(52) U.S. Cl.
USPC ............................ 717/136; 717/139; 717/142

(58) Field of Classification Search
None
See application file for complete search history.

(56) References Cited

U.S. PATENT DOCUMENTS

| 4,724,521 | A  | * | 2/1988 | Carron et al. | 717/142 |
|---|---|---|---|---|---|
| 5,287,490 | A  | * | 2/1994 | Sites | 717/142 |
| 5,448,740 | A  | * | 9/1995 | Kiri et al. | 717/155 |
| 5,586,330 | A  | * | 12/1996 | Knudsen et al. | 717/136 |
| 6,049,821 | A  | * | 4/2000 | Theriault et al. | 709/203 |
| 6,282,698 | B1 | * | 8/2001 | Baker et al. | 717/136 |
| 6,317,873 | B1 | * | 11/2001 | Townsend | 717/142 |
| 6,725,426 | B1 | * | 4/2004 | Pavlov | 715/205 |
| 6,728,950 | B2 | * | 4/2004 | Davis et al. | 717/139 |
| 7,320,122 | B2 | * | 1/2008 | Chawla et al. | 717/109 |
| 7,356,809 | B1 | * | 4/2008 | Sturges | 717/139 |
| 7,403,940 | B2 | * | 7/2008 | Narsude | 1/1 |
| 7,461,370 | B2 | * | 12/2008 | Wyschogrod et al. | 717/142 |
| 7,539,973 | B2 | * | 5/2009 | Hodge | 717/142 |
| 2002/0147847 | A1 | * | 10/2002 | Brewster et al. | 709/246 |
| 2004/0154004 | A1 | * | 8/2004 | Maine | 717/136 |
| 2004/0166834 | A1 | * | 8/2004 | Omar et al. | 455/414.1 |
| 2004/0187099 | A1 | * | 9/2004 | Irwin et al. | 717/136 |
| 2004/0199665 | A1 |   | 10/2004 | Omar et al. |   |
| 2005/0060300 | A1 |   | 3/2005 | Stolte et al. |   |
| 2005/0273773 | A1 | * | 12/2005 | Gold et al. | 717/139 |

(Continued)

FOREIGN PATENT DOCUMENTS

| EP | 0 602 263 A1 | 6/1994 |
|---|---|---|
| WO | WO 98/33130 A1 | 7/1998 |
| WO | WO 03/007184 A1 | 1/2003 |

OTHER PUBLICATIONS

H. Ouahid, et al., "Converting Web Pages into Well-formed XML Documents", 1999 IEEE, available at "http://ieeexplore.ieee.org/xpls/abs_all.jsp?arnumber=768022&tag=1", pp. 676-680.*

(Continued)

Primary Examiner — Thuy Dao
Assistant Examiner — Xi D Chen
(74) Attorney, Agent, or Firm — Shumaker & Sieffert, P.A.

(57) ABSTRACT

A report representation system and method of transforming report outputs into a standard representation format are provided. The report representation system comprises a report parser for parsing a report output, a code generator for generating a standard representation code of the report output and a code compiler for converting the standard representation code into a format representable as a fixed schema repository. The method comprises the steps of parsing a report output, generating a standard representation code of the report output and converting the standard representation code into a format representable as a fixed schema repository.

25 Claims, 5 Drawing Sheets

(56) References Cited

U.S. PATENT DOCUMENTS

| | | | |
|---|---|---|---|
| 2006/0015857 A1* | 1/2006 | Gold et al. | 717/139 |
| 2006/0031187 A1 | 2/2006 | Pyrce et al. | |
| 2006/0048107 A1* | 3/2006 | Thiagarajan et al. | 717/136 |
| 2006/0155700 A1* | 7/2006 | Dejean et al. | 707/6 |
| 2006/0200761 A1* | 9/2006 | Judd et al. | 715/517 |
| 2010/0251224 A1* | 9/2010 | Cheriton | 717/139 |

OTHER PUBLICATIONS

R. Bouret, et al., "A Generic Load/Extract Utility for Data Trnasfer Between XML Documents and Relational Databases", 2000 IEEE, available at "http://ieeexplore.ieee.org/xpls/abs_all.jsp?arnumber=853868", pp. 1-10.*

Intel Corporation, "IA-32 Intel Architecture Software Developer's Manual vol. 2: Instruction Set Reference", 2002, available at "http://pdos.csail.mit.edu/6.097/readings/intelv2.pdf", pp. 1-963.*

Sean M. Burke, "Scanning HTML", The Perl Journal, Fall 2000, [retrieved on Jul. 27, 2011]; Retrieved from Internet <URL:http://interglacial.com/tpj/19/>; pp. 1-11.*

D'Hondt, "Hybrid Aspects for Intergrating Rule-Based Knowledge and Object-Oriented Functionality", May 2004, published online; <retrieved on Jun. 6, 2012>; Retrieved from Internet <URL:http://citeseerx.ist.psu.edu/viewdoc/download?doi=10.1.1.90.4041&rep=rep1&type=pdf>;pp. 1-191.*

Ashraf, Alhajj, "ClusTex: Information Extraction from HTML pages"; 2007 IEEE: [retrieved on Sep. 25, 2013]; Retrieved from Internet <URL:http://ieeexplore.iee.org/stamp/stamp.jsp?tp=&arnumber=4221085>;pp. 1-6.*

Ashraf, et al., "Employing Clustering Techniques for Automatic Information Extraction From HTML Documents"; 2008 IEEE: [retrieved on Sep. 25, 2013]; Retrieved from Internet <URL:http://ieeexplore.iee.org/stamp/stamp.jsp?tp=&arnumber=4591416>;pp. 660-673.*

Click, Paleczyn, "A Simple Graph-Based Intermediate Representation"; 1995 ACM; [retrieved on Sep. 25, 2013]; Retrieved from Internet <URL:http://dl.acm.org/citation.cfm?id=202529>;pp. 35-49.*

Yamaguchi, et al., "Generalized Vulnerability Extrapolation using Abstract Syntax Trees"; 2012 ACM; [retrieved on Sep. 25, 2013]; Retrieved from Internet <URL:http://dl.acm.org/citation.cfm?id=2420950>;pp. 359-368.*

Office Action from related U.S. Appl. No. 11/856,423 dated Oct. 26, 2010 (8 pages).

Interview Summary from related U.S. Appl. No. 11/856,423 dated Jan. 19, 2011 (3 pages).

Amendment from related U.S. Appl. No. 11/856,423 dated Jan. 24, 2011 (9 pages).

European Search Report from corresponding European Application No. 08002969.7-1527 dated Nov. 4, 2009 (3 pages).

WAP WML. Wireless Application Protocol Wireless Markup Language Specification—Version 30 Apr. 1998 (59 pages).

Canadian Office Action from Application Serial No. 2,602,749 dated Mar. 2, 2011 (2 pages).

Amendment in response to final office action for U.S. Appl. No. 11/856,423 filed on Jun. 16, 2011 (5 pages).

European Communication from corresponding Application Serial No. 08 002 969.7-1527 dated Feb. 9, 2011 (8 pages).

Final Office Action from Application Serial No. 11/856,423 dated Mar. 16, 2011 (10 pages).

* cited by examiner

SYSTEM AND METHOD OF REPORT REPRESENTATION

FIELD OF THE INVENTION

The invention relates generally to report generation and in particular to a system and method of report representation.

BACKGROUND OF THE INVENTION

A report rendering might contain, but is not limited to, multiple pages, headers and footers with text and page numbering, in specific fonts and colors. There may be a main body section that contains several tables, with cells of numbers and words in them, some containing special formatting such as color and text attributes. A rendering might also have charts that contain graphical elements and labels. Further, the rendering contains specific structural layout information. In summary, renderings can be arbitrarily complex.

Mobile devices, including but not limited to cell phones, smart phones, and PDAs, are often constrained in memory. As a result, displaying and interacting with large, complex reports can be challenging without consuming large amounts of memory.

One way of moving a large report from a server to a mobile device involves simplifying the report, which results is a less accurate representation of the report. Another way involves downloading the report onto the mobile device, which would require a long period of time as well as a continuous connection between the mobile client and the server. Often, for large reports downloading is not robust enough.

It is desirable to have a way of representing an arbitrarily complex rendering of a report in a compact manner to reduce the memory required to represent the report on the mobile client. It is also desirable to be able to use synchronization protocols, instead of downloading, to move the report from the server to the mobile client.

SUMMARY OF THE INVENTION

It is an object of the present invention to provide a system and method of a method of transforming report outputs into a standard representation format.

In accordance with an embodiment of the present invention, there is provided a report representation system for transforming report outputs into a standard representation format. The report representation system comprises a report parser for parsing a report output, a code generator for generating a standard representation code of the report output and a code compiler for converting the standard representation code into a format representable as a fixed schema repository.

In accordance with another embodiment of the present invention, there is provided a method transforming report outputs into a standard representation format. The method comprises the steps of parsing a report output, generating a standard representation code of the report output and converting the standard representation code into a format representable as a fixed schema repository.

In accordance with another embodiment of the present invention, there is provided a memory containing computer executable instructions that can be read and executed by a computer for caring out a method of transforming report outputs into a standard representation format. The method comprises the steps of parsing a report output, generating a standard representation code of the report output and converting the standard representation code into a format representable as a fixed schema repository.

In accordance with another embodiment of the present invention, there is provided a carrier carrying a propagated signal containing computer executable instructions that can be read and executed by a computer, the computer executable instructions being used to execute a method of transforming report outputs into a standard representation format. The method comprises the steps of parsing a report output, generating a standard representation code of the report output and converting the standard representation code into a format representable as a fixed schema repository.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENTS

A system and method of the present invention will now be described with reference to various examples of how the embodiments can best be made and used. For convenience, like reference numerals are used throughout the description and several views of the drawings to indicate like or corresponding parts, wherein the various elements are not necessarily drawn to scale.

A report rendering might contain, but is not limited to, multiple pages, headers and footers with text and page numbering, in specific fonts and colors. There may be a main body section that contains several tables, with cells of numbers and words in them, some containing special formatting such as color and text attributes. A rendering might also have charts that contain graphical elements and labels. Further, the rendering contains specific structural layout information. In summary, renderings can be arbitrarily complex.

There are many situations where a database schema—the definition of a set of tables and their columns—cannot be generated dynamically and need to be determined in advance. One example of this is with most database synchronization platforms; typically the schema of the tables to identify must be specified ahead of time, and once specified, it is difficult to add or remove columns or tables to the schema.

Figure 1:
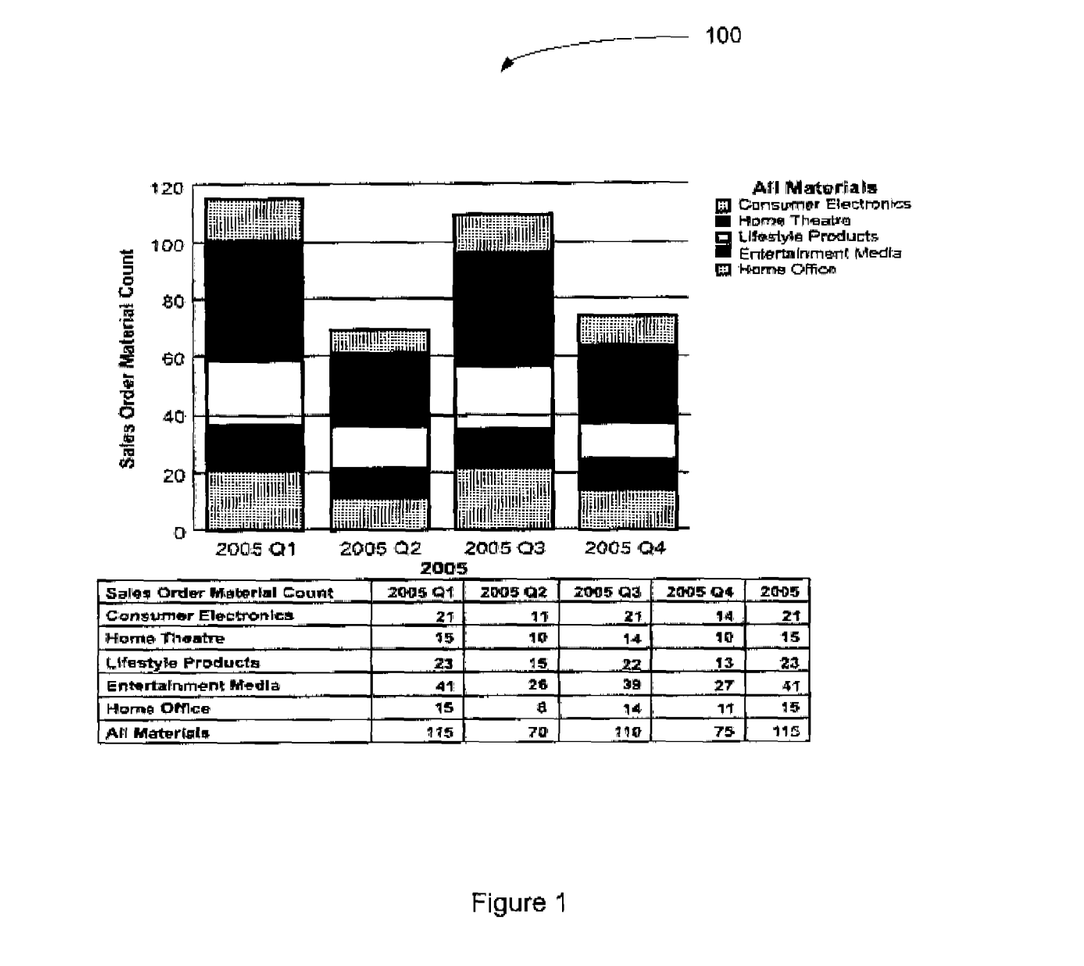
FIG. 1 shows an example of a sample report.

FIG. 1 shows an example of a sample report 100. Reports can be arbitrarily complex, containing not just tabular data, but also structural layout information, charts, graphical elements, etc.

In order to move large, complex reports from a server to a mobile device, a synchronization protocol is desirable to be able to move pieces of data in a robust manner. Nearly all synchronization protocols can take advantage of databases if the tables of the database have been pre-defined with a fixed schema. Therefore, a representation of a report should be both compact and fit into a fixed, pre-determined schema, no matter how complex (or simple) the report.

Figure 2:
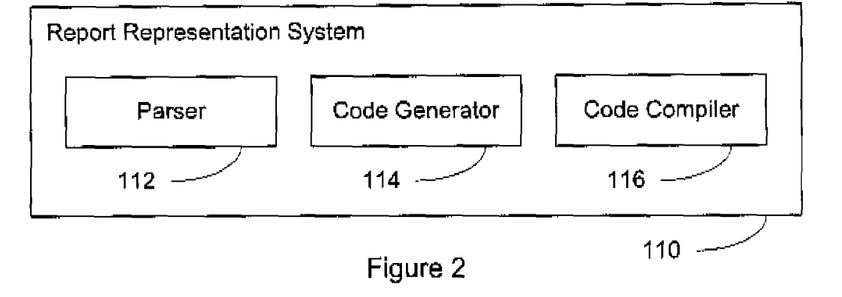
FIG. 2 shows in a component diagram an example of a report representation system for transforming a report into a standard representation format, in accordance with an embodiment of the present invention.

FIG. 2 shows in a component diagram an example of a report representation system 110 for transforming a report into a standard representation format, in accordance with an embodiment of the present invention. The report representation system 110 comprises a report parser 112 for parsing a report output, a code generator 114 for generating a standard representation code of the report output, and a code compiler 116 for converting the standard representation code into a format representable as a fixed schema database (such as a set of records). Other components may be added to the report representation system 110, including an optimizer for optimizing the size and performance of the generated code, a synchronizer for moving the database table content from the server to the client, and a renderer for rendering scenes of the report output from the database tables.

Preferably, the standard format representation produced by the code generator 114 is a procedural and declarative language. This language describes the full set of report information desired to be preserved in a fixed schema database representation. Such a language can be compiled into a fixed set of tables: one code table and one or more resource tables. The exact number of resource tables required is based on the set of resources supported by the language, but the number is predetermined and fixed based on the language.

Figure 3:
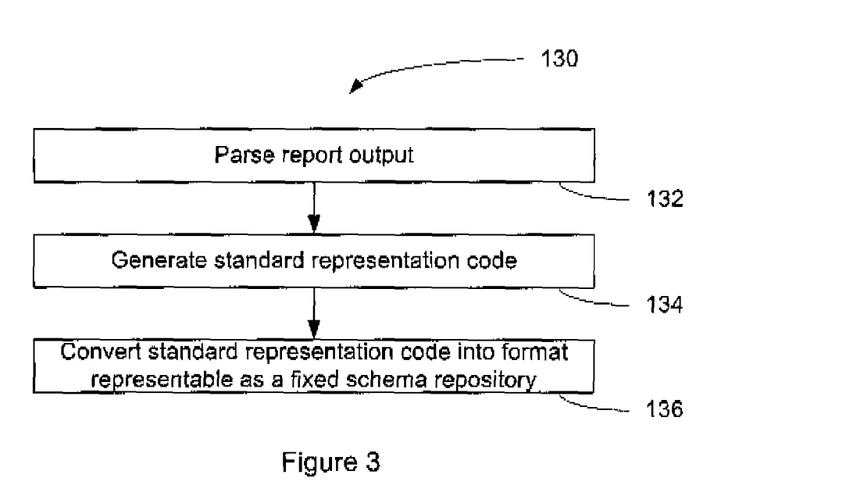
FIG. 3 shows in a flowchart an example of a method of transforming a report output into a standard representation format, in accordance with an embodiment of the report representation system.

FIG. 3 shows in a flowchart an example of a method of transforming a report output into a standard representation format (130), in accordance with an embodiment of the report representation system 110. The method (130) begins with receiving a report output. Next, the report output is parsed by the parser 112 (132) into objects that are passed to the code generator 114. The code generator 114 generates a standard representation code of the report output (134). The standard representation code is then sent to the code compiler 116 for converting the standard representation code into a format representable as a fixed schema database (136) (such as a set of records). Other steps may be added to the method, including optimizing the size and performance of the generated code, moving the database table content from the server to the client, and rendering scenes of the report output from the database tables.

In one embodiment, and in the examples that follow, a procedural and declarative language is defined. However, one skilled in the art could apply the teachings of the present invention to languages of the same or different types.

The following excerpt is an example of a standard representation code that is generated by the code generator 114, in accordance with an embodiment of the report rendering system 110. This excerpt is a portion of the "program" that produces a rendering of the first two rows of the table in report output 100 displayed in FIG. 1:

```
TableBegin ""
TableFreeze 1 1
; row 0
TableRow
TableCell
Call xm0
Text "Sales Order Material Count"
TableCell
Call m10
Text "2005 Q 1"
TableCell
Call m10
Text "2005 Q 2"
TableCell
Call m10
Text "2005 Q 3"
TableCell
Call m10
Text "2005 Q 4"
TableCell
Call o10
Text "2005"
; row 1
TableRow
TableCell
Call m10
Text "Consumer Electronics"
TableCell
Call mv0
Text "21"
TableCell
Call mv0
Text "11"
TableCell
Call mv0
Text "21"
TableCell
Call mv0
Text "14"
TableCell
Call ov0
Text "21"
...
TableEnd
```

The following excerpt is an example of a standard representation code that is generated by the code generator 114, in accordance with an embodiment of the report rendering system 110. This excerpt is a portion of the "program" that starts the rendering of the chart show in report output 100 displayed in FIG. 1:

```
ChartBegin
Image file://chart_graphic.png
; image map 'rsvptt0'
SpotBegin 0x00003021 0x00001FD1
Label "2005: 2005 Q 1. All Materials: Home Office. Sales Order Material Count: 15"
SpotEnd
SpotBegin 0x00003021 0x00005249
Label "2005: 2005 Q 1. All Materials: Entertainment Media. Sales Order Material Count: 41"
SpotEnd
SpotBegin 0x00003021 0x00008BB4
Label "2005: 2005 Q 1. All Materials: Lifestyle Products. Sales Order Material Count: 23"
SpotEnd
...
ChartEnd
```

Figure 4:
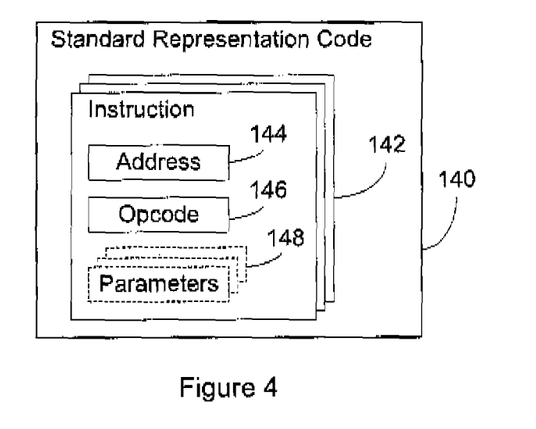
FIG. 4 shows in a diagram an example of a standard representation code which when executed generates a report output, in accordance with an embodiment of the report representation system.

Programs created using the standard representation code are made up of a finite set of instructions. FIG. 4 shows in a diagram an example of a standard representation code 140 which when executed generates a report output, in accordance with an embodiment of the report representation system 110. The standard representation code 140 comprises at least one instruction 142. Each instruction 142 has an address 144 for uniquely identifying the instruction 142 within the code 140, an opcode 146 for specifying an action associated with the instruction 142, and optionally parameters 148 associated with the opcode 146. Preferably, addresses 144 in a program 140 are a monotonically increasing series of integers, starting at zero. Preferably, an opcode 146 is an integer which represents one of a set of operations supported by the code (sometimes referred to as a language) 140. Preferably, there are two parameters 148 that are also integers, but these integers can represent numbers (such as font sizes), strings (such as the word "Hello"), or even images (such as a picture of a pie chart). The representation of strings and images via an integer is accomplished by creating a string and image table—two resource tables—which contains strings and images that can be referenced by a simple integer through a lookup operation.

Figure 5:
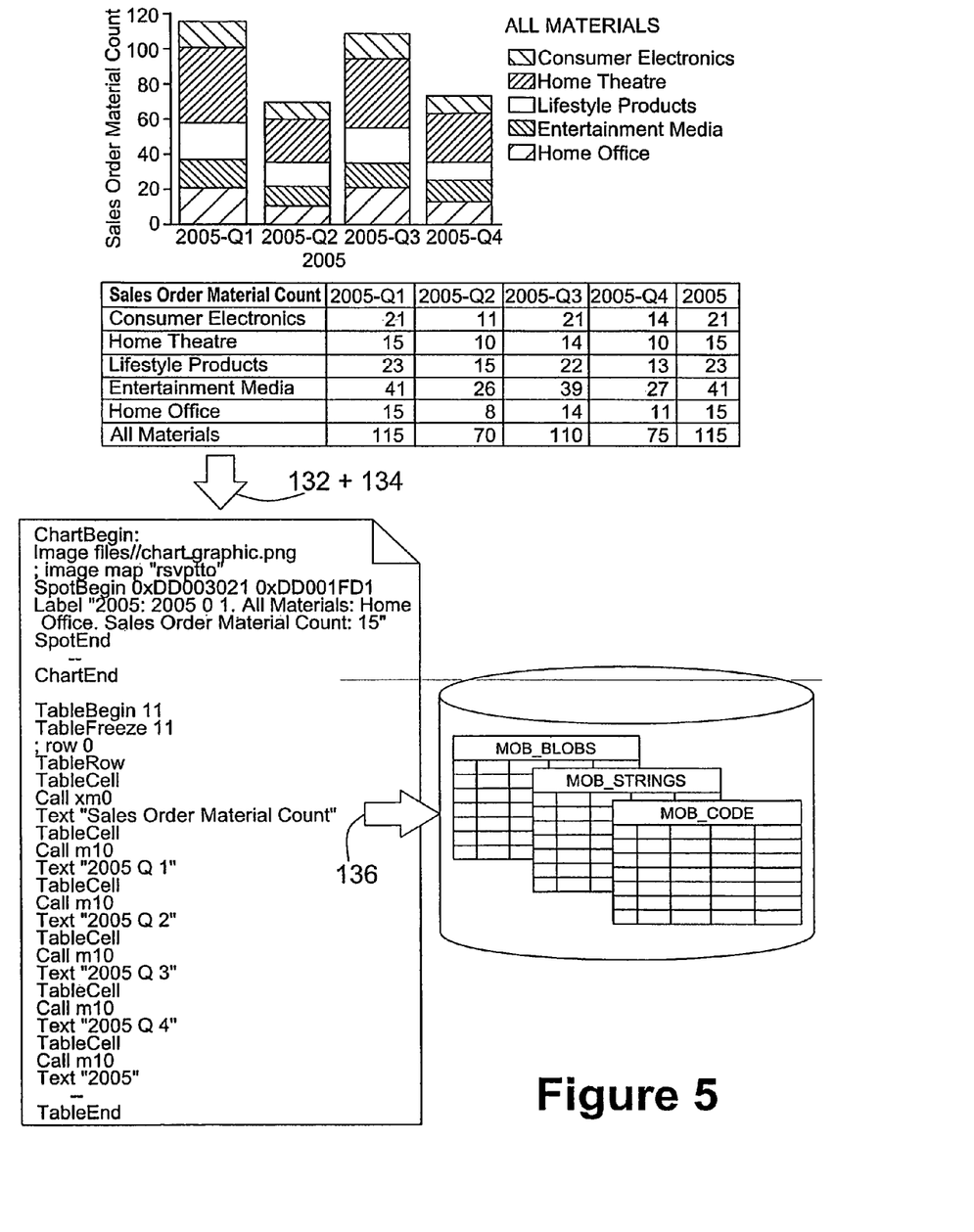
FIG. 5 shows in a screenshot an example of the process flow of a report output is converted into a standard representation format in a set of database tables, in accordance with an embodiment of the report representation system.

After a report output is converted into a program, that program can be "compiled" using standard computer science techniques into code and referenced objects, such as string literals and Binary Large OBjectS (blobs), which can then be stored in any standard database with a fixed schema. FIG. 5 shows in a screenshot an example of the process flow of how a report output is converted into a standard representation format in a set of database tables, in accordance with an embodiment of the report representation system 110.

Figure 6:
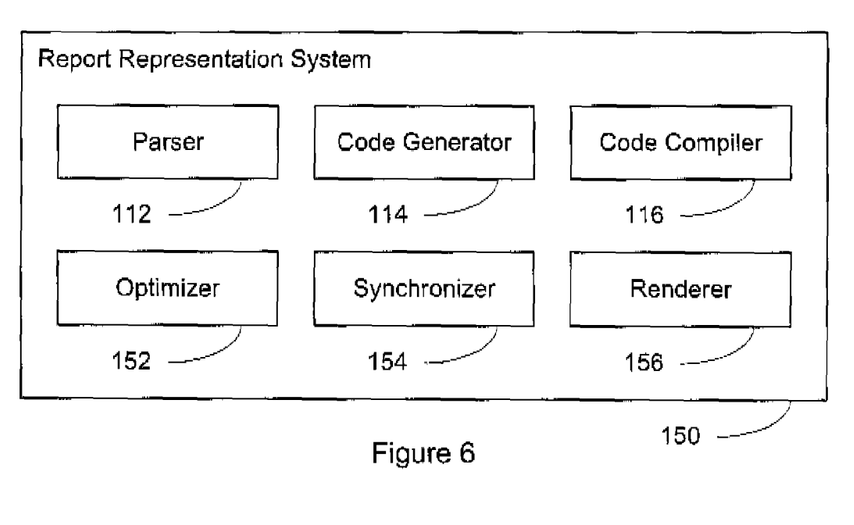
FIG. 6 shows in a component diagram another example of a report representation system, in accordance with an embodiment of the present invention.

FIG. 6 shows in a component diagram another example of a report representation system 150, in accordance with an embodiment of the present invention. The report representation system 150 comprises the parser 112, the code generator 114, the code compiler 115, an optimizer 152 for optimizing the size and performance of the generated code, a synchronizer 154 for moving the database table content from the server to the client, and a renderer 156 for rendering scenes of the report output from the database tables.

The optimizer 152 comprises optimization functionality that can be performed on the report output, including, reusing string literals, resizing images for mobile displays, removing portions of the report that are not visible or not relevant for mobile displays, and simplifying complex regions of the output report. Examples of not visible or not relevant portions include JavaScript and report output data that is never displayed. An example of simplifying a complex region includes replacing tool tip polygons with a single point at the polygon centroid. Other functionality can be added to the optimizer 152.

The synchronizer 154 uses synchronization protocols to move database records that make up the standard format representation in an efficient and robust manner from one device to another, typically from a server to a mobile client. Optionally, the synchronization protocol can be bi-directional which allows the report output to be modified by the client and those changes synchronized back to the server.

The renderer 156 reads the database records that make up the standard format representation and produces a rendering of the report output on the target display, such as a mobile client display.

Code Generator 114

Figure 7:
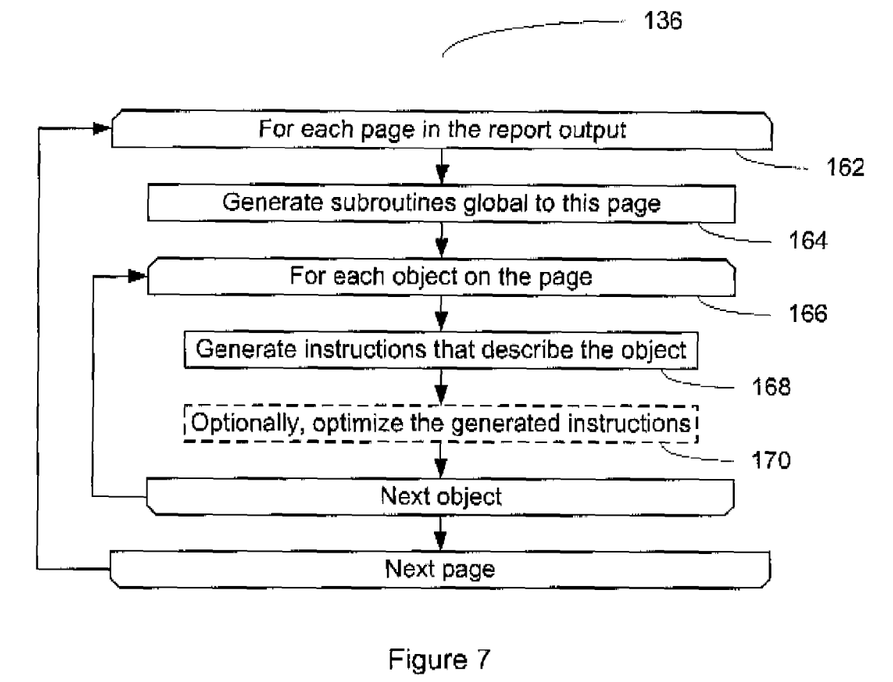
FIG. 7 shows in a flowchart an example of a method of generating standard representation code, in accordance with an embodiment of the report representation system.

FIG. 7 shows in a flowchart an example of a method of generating standard representation code (134), in accordance with an embodiment of the report representation system 110. The code generator 114 receives as input a description of each page in the report output. This page description is in the format of the report system, typically HTML or XML-based. This is parsed (132) into a series of lexical elements using standard computer science methods.

For each page in the report output (162), the code generator 114 first generates any subroutines that are global to this page (164). Examples of such subroutines include colour and font changes that may be referenced by page objects. In one example of an implementation of the report representation system 110, each cascading style sheet (CSS) definition on the page is parsed and results in the generation of a subroutine with code that defines the subroutine name using the CSS name and then generates instructions to set the background color, the text color, the font format (bold, italic, underline, etc.), and the text alignment (left, right, center, etc.), followed by an instruction to end the subroutine.

Next, for each object (such as a table or a chart) that is on the page (166), the code generator 114 generates instructions that describe the object (168). These instructions are meant to be subsequently read back by the renderer 156 to render the object being described. For example, a table object generates an instruction to start the table, an instruction to start a table row, and then instructions to draw each table cell in each table row. This is then repeated for each cell and for each row in the table. In a second example, a chart object generates instructions to mark the start of a chart, draw a graphical image (represented as a blob in the system), and specify points and regions of interest within the graphical image (such as the bars of a bar chart). Additionally, instructions may be generated to call the previously-generated subroutine for each CSS reference used by the object.

The optimizer component 152 is an optional component that can perform optimizations on the code (170) as it is generated, resulting in much smaller generated code. In one example of an implementation of the report representation system 110, the optimizer 152 keeps track of all generated subroutines in an internal list, and then at the end of the page removes any generated subroutines that were not used by the end of a page. The optimizer 152 then removes those unused subroutines. In a second example, the optimizer 152 keeps track of all strings and images that are referenced by the generated code, and ensures that the generated code only references those strings and images once instead of multiple times. In a third example, the optimizer 152 inspects the size of all graphical images that are generated and, when those images are larger than can be displayed on the mobile device, resizes the images automatically so that they take up much less space in the generated code.

When all the pages of the report output have been processed, code generation is complete.

Code Compiler 116

Figure 8:
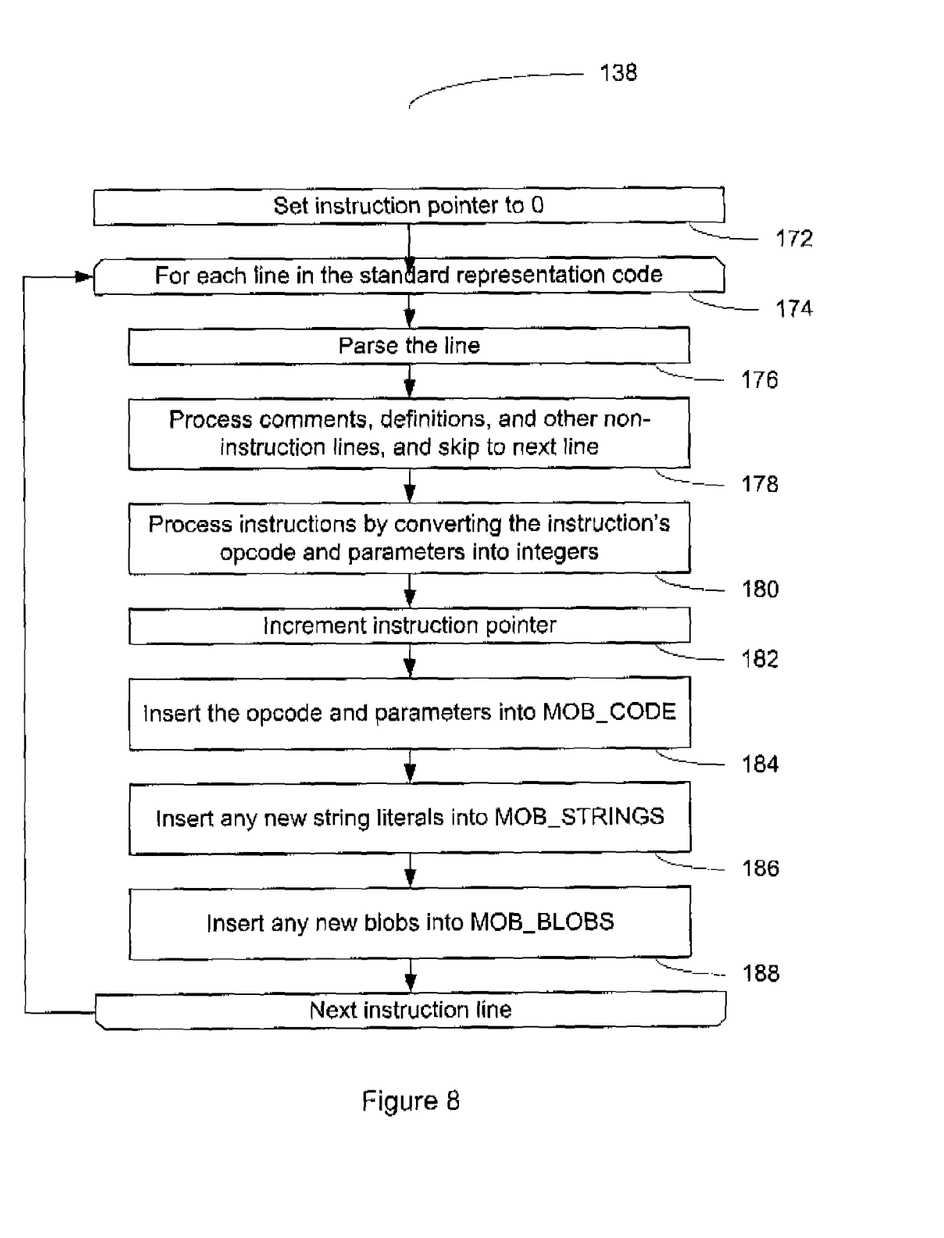
FIG. 8 shows in a flowchart an example of a method of converting the standard representation code into a set of records in a fixed schema database, in accordance with an embodiment of the report representation system.

FIG. 8 shows in a flowchart an example of a method of converting the standard representation code into a set of records in a fixed schema database (138), in accordance with an embodiment of the report representation system 110. The code compiler 116 receives as input the generated code from the code generator 114. This code arrives as a set of lines. After resetting the instruction pointer (IP) to 0 (172), the code compiler processes each line (174) one at a time, as follows.

First the line is parsed (176). In one example of an implementation of the report representation system 110, each line is parsed as a UTF-8 string (a standard method of representing strings in any language as a series of bytes) and, using standard lexical analysis techniques, converted into a list of tokens. These tokens are then matched against patterns that are based on the standard representation code.

If the line's tokens match the pattern of a comment, then the line has no effect and the code compiler skips to the next line (178).

If the line's tokens match the pattern of a label or symbolic definition, then the symbol name and value pair is inserted into a symbol table (an in-memory string-to-integer map). Symbols that are encountered in subsequent lines can then be substituted with their values by looking up the symbol name in the symbol table.

If the line's tokens match the pattern of an instruction, then the opcode string is converted into its unique opcode integer (e.g., an opcode string of "TableBegin" is converted to an integer of 0×49 hexadecimal in an implementation), and each parameter (if any) is converted to an integer value (180). Parameters which are symbols are then converted to an integer value by looking up the symbol value in the symbol table described above. Parameters that are strings are inserted into the MOB_STRINGS table (186), which results in associating that string value with a unique integer ID. This unique ID is then used as the string parameter value. Parameters that are blobs are inserted into the MOB_BLOBS table (188), which results in associating that blob value with a unique integer ID. This unique ID is then used as the blob parameter value.

At this point, the entire line has been converted into a series of integers (180)—the current address, the opcode, and the parameters—which are then inserted into the MOB_CODE table (184). Along with the insertion (184), the IP is incremented by one (182). The code compiler then continues to the next line (174).

When all lines have been handled, code compilation is complete.

Example Schema

In one embodiment of the report representation system 110, any program can be encoded as records into these three tables: a "code" table, a "string" table, and an "image" table; with the schemas shown below. As a result, any rendering which can be described by a declarative/procedural language, can be represented and stored by the tables defined in this schema. In the example shown in FIG. 5, the schema defined below is used. However, this schema is only one instance of several possible schemas that can be used to represent such a "compiled" report.

Code Table:

Table 1 is an example of a code table. The code table stores the code records (the instructions that describe the report output and how to render it) associated with all reports. In this example of a code table, each instruction in a report's "program" is made up of an opcode, and two parameters (p1 and p2), while the instructions are sequenced by the address value.

TABLE 1

| Column Name | Data Type | Description |
| --- | --- | --- |
| RENDER_ID | int | Unique report output identifier |
| ADDRESS | int | Instruction's address |
| OPCODE | tinyint | Instruction's opcode |
| P1 | int | Instruction's first parameter |
| P2 | int | Instruction's second parameter |

Strings Table:

Table 2 is an example of a strings table. In this example, the strings table stores the string literals referenced by a report. To save memory, string literals can be re-used as much as possible within a given report output.

TABLE 2

| Column Name | Data Type | Description |
| --- | --- | --- |
| RENDER_ID | Int | Unique render identifier |
| STRING_ID | Int | Integer identifier for this string literal. This ID is used by some instructions in the report output's code. |
| STRING_VALUE | varchar(255) nullable | The string contents. |

Blobs Table:

Table 3 is an example of a blobs table. The blobs table stores the binary objects referenced by a report output. Blobs are typically embedded images that occur within the report output, such as corporate graphics.

TABLE 3

| Column Name | Data Type | Description |
| --- | --- | --- |
| RENDER_ID | int | Unique report output identifier |
| BLOB_ID | int | Integer identifier for this blob. This ID is used by instructions in the report output's code. |
| SEQUENCE | int | Zero-relative sequence number for this blob's segment, in case the blob is larger than 1024 bytes and therefore needs to span multiple rows |
| BLOB_VALUE | varbinary(1024) | A blob, or segment of the blob, up to 1024 bytes in size. |

Advantageously, use of the report representation system 110, 150 and methods allows for the representation of a report's rendered output, no matter how complex, in a set of tables that can then be synchronized across multiple locations. This allows, for example, the transfer of a report rendering from a server to a PC or mobile device through a simple database synchronization process.

Another advantage is that the fixed schema implies an obvious file format that can be used to store any arbitrarily complex rendering using a single- or multiple-file database.

The systems and methods according to the present invention described above may be implemented by any hardware, software or a combination of hardware and software having the above described functions. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A computer implemented method comprising:
receiving a report configured in accordance with a language;
parsing, by at least one computer, the report into a group of objects;
generating representation code from the group of objects, wherein the representation code describes each object from the group of objects and is configured in accordance with a different language;
processing each line of the representation code into one or more tokens; matching each of the one or more tokens against a respective matching pattern; and processing the one or more tokens based on the respective matching pattern into the code by at least, for each of the one or more tokens:
   identifying the token as one of a non-instruction, an opcode, a string literal, or a binary large object (blob) based on the matching against the patterns, wherein the opcode specifies an action associated with a respective instruction included in the representation code;
   responsive to determining that the token comprises the non-instruction, processing the token as a non-instruction token;
   responsive to determining that the token comprises the opcode, converting the opcode into an integer and storing the integer in the code table of the database;
   responsive to determining that the token comprises the string literal responsive to determining that the string literal is not already stored in a first referenced object table, storing the string literal into the first referenced object table; and
   responsive to determining that the token comprises the blob and responsive to determining that the blob is not already stored in the second referenced object table, storing the blob into the second referenced object table.

2. The method of claim 1, wherein generating the representation code comprises:
   for each page in the report, and for each respective object in the page, generating instructions of the different language that describe the respective object.

3. The method of claim 1, further comprising optimizing the size and performance of the generated code by at least:
   maintaining a list of generated subroutines; and
   responsive to completing the processing of each line of the representation code:
      determining a set of unused generated subroutines; and
      removing the set of unused generated subroutines from the generated code.

4. The method of claim 1, further comprising moving content stored in one or more of the code table and the plurality of resources tables from a server to a client.

5. The method of claim 1, further comprising rendering scenes of the report using content stored in one or more of the code table and the plurality of resources tables.

6. The method of claim 1,
   wherein a size of the blob is greater than a maximum size storable in a single row of the second reference object table, and
   wherein storing the blob into the second reference object table comprises:
      segmenting the blob into two or more segments, each of the two or more segments having a size that is less than or equal to the maximum size; and
      storing each of the two or more segments and a corresponding segment sequence number in a respective row of the second reference object table.

7. The method of claim 2, further comprising for each page in the report, generating subroutines global to each page in the report.

8. The method of claim 2, further comprising:
   optimizing the generated code.

9. The method of claim 2, further comprising:
   for each page in the report, generating subroutines global to each page in the report.

10. The method of claim 8, wherein the optimization is bi-directional.

11. The method of claim 10, further comprising:
   allowing the report to be modified by a client; and
   synchronizing modifications to the report back to a server.

12. A report representation system comprising:
   at least one computer;
   a report parser to parse a report into a group of objects, wherein the report is configured in accordance with a language;
   a code generator to generate representation code of the report from the group of objects, wherein the representation code describes each object from the group of objects and is configured in accordance with a different language; and
   a code compiler to process each line of the representation code into one or more tokens, match each of the one or more tokens against a respective matching pattern, and process the one or more tokens based on the respective matching pattern into code by at least, for each of the one or more tokens:
      identifying the token as one of a non-instruction, an opcode, a string literal, or a binary large object (blob) based on the respective matching pattern, wherein the opcode specifies an action associated with a respective instruction included in the representation code;
      responsive to determining that the token comprises the non-instruction, processing the token as a non-instruction token;
      responsive to determining that the token comprises the opcode, converting the opcode into an integer and store the integer in a code table of the database;
      responsive to determining that the token comprises the string literal and responsive to determining that the string literal is not already stored in a first referenced object table, storing the string literal into the first referenced object table responsive to determining that the string literal is not already stored in the first referenced object table; and
      responsive to determining that the token comprises the blob, store the blob into a second referenced object table responsive to determining that the blob is not already stored in the second referenced object table,
   wherein at least one of the report parser, the code generator, and the code compiler is executable by the at least one computer.

13. The report representation system of claim 12, wherein the different language is a procedural and declarative language.

14. The report representation system of claim 12, wherein the integer into which each of the one or more opcodes is converted represents one of a set of operations supported by the language.

15. The report representation system of claim 12, wherein the one or more parameters comprise integers for representing at least one of numbers, strings and binary large objects.

16. The report representation system of claim 12, further comprising an optimizer for optimizing the size and performance of the generated code.

17. The report representation system of claim 12 further comprising:
   a synchronizer to move content stored in one or more of the code table and the plurality of resource tables from a server to a client.

18. The report representation system of claim 12, further comprising a renderer to render scenes of the report from the database tables.

19. The report representation system of claim 12,
wherein the representation code includes instructions that, when executed by the at least one computer, generate the report, and
wherein each instruction of the instructions includes an address that uniquely identifies the respective instruction within the representation code.

20. The report representation system of claim 12,
wherein a size of the blob is greater than a maximum size storable in a single row of the second reference object table, and
wherein the code compiler stores the blob into the second reference object table by at least segmenting the blob into two or more segments, each of the two or more segments having a size that is less than or equal to the maximum size, and storing each of the two or more segments and a corresponding segment sequence number in a respective row of the second reference object table.

21. The report representation system of claim 16, wherein the optimization is bi-directional.

22. The report representation system of claim 16, wherein the optimizer optimizes the size and performance of the generated code by at least maintaining a list of generated subroutines, and, responsive to completing the processing of each line of the representation code, determining a set of unused generated subroutines and removing the set of unused generated subroutines from the generated code.

23. The report representation system of claim 19, wherein a grouping including each address comprises a monotonically increasing series of integers.

24. The report representation system of claim 21, wherein the report representation system allows the report to be modified by a client, the report representation system further comprising:
a synchronizer to synchronize modifications to the report from the client back to a server.

25. A memory containing computer executable instructions that can be read and executed by a computer for carrying out a method, the method comprising:
parsing a report into a group of objects, wherein the report is configured in accordance with a language;
generating representation code from the group of objects, wherein the representation code describes each object from the group of objects and is configured in accordance with a different language;
processing each line of the representation code into one or more tokens;
matching each of the one or more tokens against a respective matching pattern; and
processing the one or more tokens based on the respective matching pattern into the code by at least, for each of the one or more tokens:
identifying the token as one of a non-instruction, an opcode, a string literal, or a binary large object (blob) based on the matching against the patterns, wherein the opcode specifies an action associated with a respective instruction included in the representation code;
responsive to determining that the token comprises the non-instruction, processing the token as a non-instruction token;
responsive to determining that the token comprises the opcode, converting the opcode into an integer and storing the integer in the code table of the database;
responsive to determining that the token comprises the string literal and responsive to determining that the string literal is not already stored in the first referenced object table, storing the string literal into the first referenced object table; and
responsive to determining that the token comprises the blob and responsive to determining that the blob is not already stored in the second referenced object table, storing the blob into the second referenced object table.

* * * * *